No. 617,047. Patented Jan. 3, 1899.
L. RAKUS.
APPARATUS FOR MAKING WHEELS FOR VEHICLES.
(Application filed Feb. 10, 1897.)
(No Model.) 2 Sheets—Sheet 1.
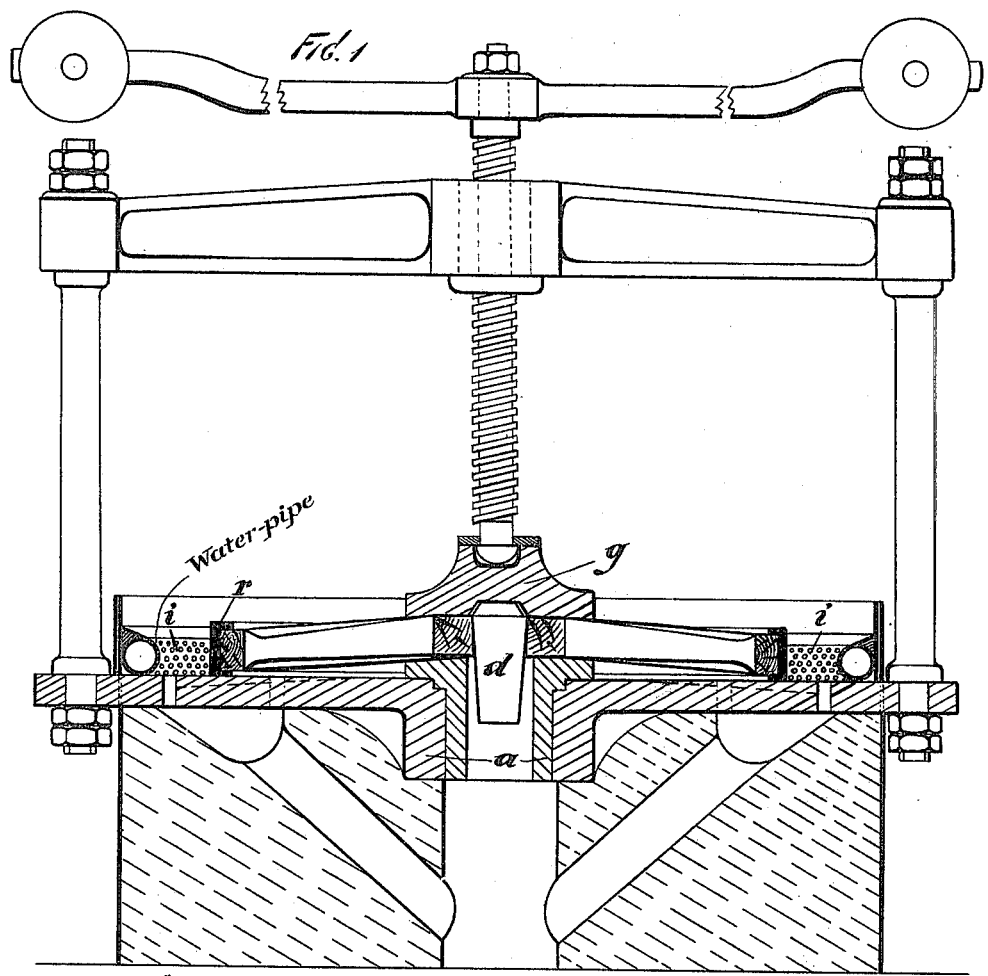
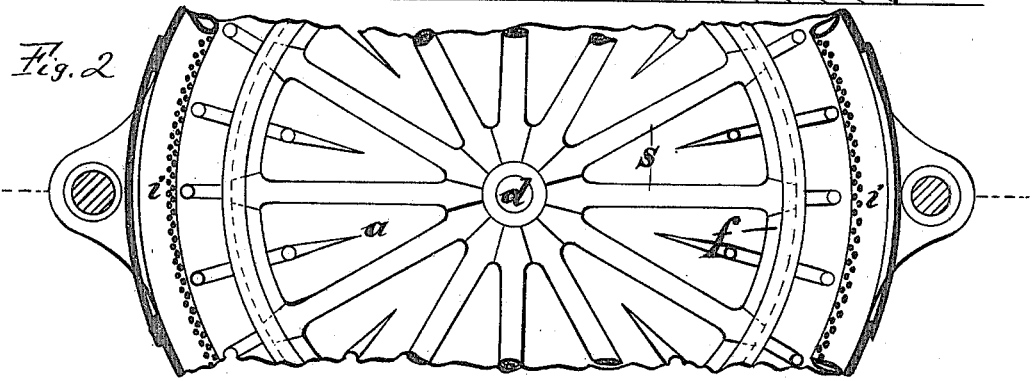

No. 617,047. Patented Jan. 3, 1899.
L. RAKUS.
APPARATUS FOR MAKING WHEELS FOR VEHICLES.
(Application filed Feb. 10, 1897.)
(No Model.) 2 Sheets—Sheet 2.
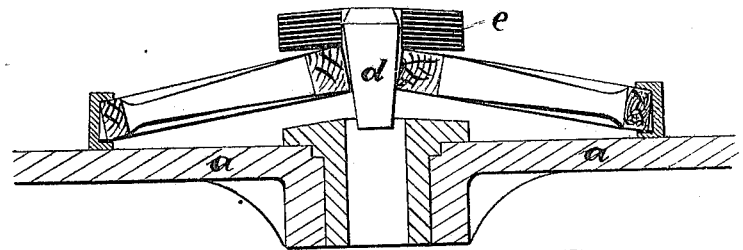
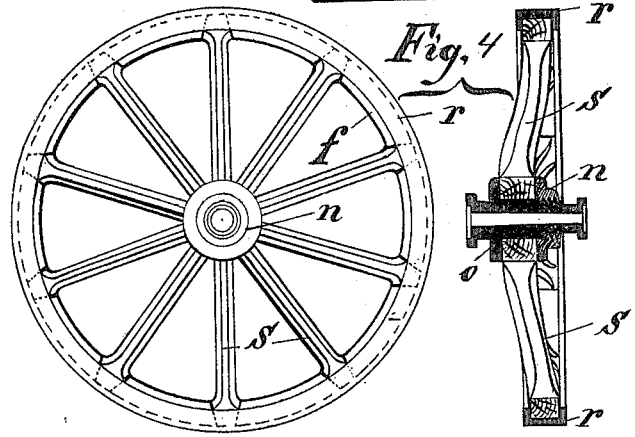
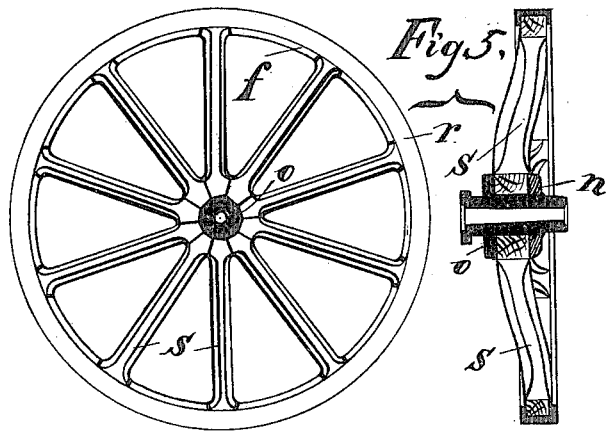
WITNESSES: INVENTOR
Leo Rakus
BY
Edgar Tate
ATTORNEYS.

UNITED STATES PATENT OFFICE.

LEO RAKUS, OF MÄHRISCH, AUSTRIA-HUNGARY, ASSIGNOR OF TWO-THIRDS TO ALOIS MIHATSCH AND AUGUST LUTTNAR, OF SAME PLACE.

APPARATUS FOR MAKING WHEELS FOR VEHICLES.

SPECIFICATION forming part of Letters Patent No. 617,047, dated January 3, 1899.

Application filed February 10, 1897. Serial No. 622,882. (No model.)

*To all whom it may concern:*

Be it known that I, LEO RAKUS, technical clerk in the Patenträder - Fabriks - Gesellschaft, Mährisch-Ostrau, a subject of the Emperor of Austria-Hungary, residing at Mährisch - Ostrau, Austria - Hungary, have invented certain new and useful Improvements in Apparatus for Making Wheels for Vehicles, of which the following is a specification.

This invention has been patented to me in Germany, No. 87,705, dated July 18, 1896; in England, No. 7,807, dated April 18, 1895, and in Hungary, No. 2,336, dated March 9, 1895.

The object of the invention is to provide an improved device or apparatus for manufacturing wheels in which the fixing in of the spokes is effected by springing them in between the rim and nave.

In the accompanying drawings, which are in illustration of the invention, Figure 1 is an elevation, partly in section, of the device. Fig. 2 is a plan view of the wheel in place upon the bed-plate. Fig. 3 is a detail view showing a modified form of pressure-block. Figs. 4 and 5 are views of wheels which my apparatus is especially designed to construct.

In the form of wheel shown in Fig. 4 the tire is U-shaped, so that the pieces $f$, which form the fellies, can fit between its flanges, their ends abutting against the outer ends of spokes $s$ and holding the latter securely in their position. The middle parts of the spokes are of the usual shape; but their ends are formed so that they fit closely against each other and form the outer nave of the wheel. The central nave itself consists of two parts, the flange and tube $o$ on one side and the separate disk $n$ on the other side. The tube is in the form of a truncated cone or pyramid, and its outer end is provided with a screw-thread, upon which the disk $n$ is screwed, or if the outer surface is pyramidal in shape, as illustrated in Fig. 4, the disk $n$, which is made of corresponding shape, may simply be hammered or pressed upon it. The fellies as well as the spokes must be so arranged that when the former are placed between the outer ends of the spokes, which are themselves fitted between the tire and the nave, they can by pressure exerted upon them be firmly held in their places. The completion of the wheel described is therefore effected by such pressure properly applied by the apparatus which forms the subject of the present application. For this purpose the fellies are arranged with the spokes between them and extending from the tire to the nave, the fellies being loosely fitted between the flange of the U-formed tire, the spokes between them being elevated at the center, so as to form a flat cone, Fig. 2. The springing together of the spokes and fellies is then effected by pressure upon the apex of the cone, such pressure being made to act not only downward, but also outwardly from the axis of the cone, the spokes and fellies being pressed together in the hollow tire and the surfaces of the inner ends of the spokes being also pressed together to form the nave. When the spokes have been pressed downward into the proper position to form the finished wheel, the central nave is inserted. It is advisable that the wheel formed as described should be still more firmly kept pressed together by warming the metal tire in the way ordinarily practiced by wheelwrights, so that no very great pressure is required to force the spokes into the hollow tire and to press their inner ends together. This heated tire is then cooled, and the separate parts of the wheel become then firmly held together.

The bed-plate $a$ of the screw-press is open at the center, and if the wheel is to be dished it is raised at the center. It is surrounded with a perforated pipe $i$. The tire $r$ described is placed concentrically upon the bed-plate, and between its flanges the pieces forming the fellies and the ends of the spokes are fitted, as already described, and a conical or pyramid shaped mandrel $d$, corresponding with the shape of the nave-center, is inserted in the central opening. The pressure-plate $g$ corresponds on its lower side with the nave of the wheel and is pressed down on the mandrel $d$. In this way it forces down the spokes and the mandrel, the latter from its wedge shape pressing the spokes against each other and into the tire. If the spokes are of soft material or liable to splinter, an elastic block $e$ (preferably of india-rubber) is inserted between the pressure-plate and the spokes which are to be pressed down, and in this way the edges of the spokes which receive the first pressure are not injured. (See Fig. 3.)

By the use of the block e the spokes are first pressed partly down, and the pressure-plate is then raised and the block e removed, the pressure-plate being then again forced down, so that the spokes are brought to their proper position, and they, together with the fellies, are by the action of the mandrel d firmly pressed together between the flanges of the tire. Water is then allowed to flow from the perforated pipe i upon the hot tire, so that it is cooled and the spokes and fellies tightly held together. Finally, after the removal of the mandrel the nave-center is inserted by means of the same press.

Having now particularly described and ascertained the nature of my said invention and in what manner the same is to be performed, I declare that what I claim is—

In combination, the bed-plate having the central opening, a pressure-plate with means for applying pressure thereto, a centrally-arranged mandrel, an annular perforated pipe, and a series of openings in the bed-plate adjacent to said perforated pipe, substantially as described.

Signed at Mährisch-Ostrau, in the Empire of Austria-Hungary, this 12th day of July, 1895.

LEO RAKUS.

Witnesses:
AUGUST LUTTNAR,
ANDREAS MERLIN.